(12) United States Patent
Abe (10) Patent No.: US 11,312,178 B2
(45) Date of Patent: Apr. 26, 2022

(54) NON-PNEUMATIC TIRE

(71) Applicant: BRIDGESTONE CORPORATION, Tokyo (JP)

(72) Inventor: Akihiko Abe, Tokyo (JP)

(73) Assignee: BRIDGESTONE CORPORATION, Tokyo (JP)

(*) Notice: Subject to any disclaimer, the term of this patent is extended or adjusted under 35 U.S.C. 154(b) by 227 days.

(21) Appl. No.: 16/612,191

(22) PCT Filed: Mar. 19, 2018

(86) PCT No.: PCT/JP2018/010848
§ 371 (c)(1),
(2) Date: Nov. 8, 2019

(87) PCT Pub. No.: WO2018/207468
PCT Pub. Date: Nov. 15, 2018

(65) Prior Publication Data
US 2020/0207150 A1 Jul. 2, 2020

(30) Foreign Application Priority Data
May 11, 2017 (JP) .............................. JP2017-094664

(51) Int. Cl.
*B60C 7/14* (2006.01)
*B60C 7/18* (2006.01)

(52) U.S. Cl.
CPC ................ *B60C 7/146* (2021.08); *B60C 7/18* (2013.01); *B60C 7/14* (2013.01)

(58) Field of Classification Search
CPC .......... B60C 7/18; B60C 7/107; B60C 7/146; B60C 7/14; B60C 2007/107; B60C 2007/146; B60B 9/04
See application file for complete search history.

(56) References Cited

U.S. PATENT DOCUMENTS 1,037,412 A   9/1912 Bartlett
1,230,141 A * 6/1917 Erhard et al. ............. B60C 7/18
                                                    152/297

(Continued)

FOREIGN PATENT DOCUMENTS

CN       2794891 Y    7/2006
CN    201544735 U    8/2010

(Continued)

OTHER PUBLICATIONS

Communication dated Oct. 19, 2020, from the European Patent Office in application No. 18798145.1.

(Continued)

*Primary Examiner* — Kip T Kotter
(74) *Attorney, Agent, or Firm* — Sughrue Mion, PLLC (57) ABSTRACT

The present invention includes: an elastically deformable tire part (7) which includes an inner cylinder, an outer cylinder (4) configured to surround the inner cylinder from the outside in a tire radial direction, and a linking member (3) configured to link the inner cylinder to the outer cylinder (4) and a tread member (5) externally fitted onto the outer cylinder (4), wherein an elastic modulus of a material forming the tread member (5) is smaller than an elastic modulus of a material forming a tire part (7), an outer circumferential surface of the tread member (5) is formed in a curved shape in which the outer circumferential surface thereof protrudes outward in the tire radial direction when viewed in a vertical cross-sectional view in both a tire width direction and the tire radial direction, the outer cylinder (4) includes an outer circumferential section (41) positioned on a tire equatorial section, side sections (42) positioned on both sides in the tire width direction with respect to the outer circumferential section (41), and a shoulder section (43) configured to connect the outer circumferential section (41) to the side sections (42), the outer circumferential section (Continued)

(41) is formed in a straight line shape in which the outer circumferential section (41) extends in the tire width direction when viewed in the vertical cross-sectional view, and the shoulder section (43) gradually extends inward in the tire radial direction as it goes outward in the tire width direction.

4 Claims, 5 Drawing Sheets

(56) References Cited

U.S. PATENT DOCUMENTS

| | | | |
|---|---|---|---|
| 1,232,971 A * | 7/1917 | Purdy | B60C 7/18 |
| | | | 152/265 |
| 1,287,762 A | 12/1918 | Sagen | |
| 1,622,848 A | 3/1927 | Rush | |
| 2011/0290394 A1 | 12/2011 | Luchini et al. | |
| 2012/0038207 A1 | 2/2012 | Williams et al. | |
| 2013/0342001 A1 | 12/2013 | Imamiya et al. | |
| 2014/0251518 A1 | 9/2014 | Abe et al. | |
| 2014/0352861 A1 | 12/2014 | Sabetti | |
| 2016/0176241 A1 | 6/2016 | Shimizu et al. | |
| 2016/0243890 A1 | 8/2016 | Nishida et al. | |
| 2017/0136814 A1 | 5/2017 | Abe et al. | |
| 2017/0326915 A1 * | 11/2017 | Son | B60C 7/24 |
| 2017/0341464 A1 | 11/2017 | Nishida | |

FOREIGN PATENT DOCUMENTS

| | | | |
|---|---|---|---|
| CN | 201580214 U | 9/2010 | |
| CN | 104114380 A | 10/2014 | |
| CN | 104890448 A | 9/2015 | |
| CN | 105408130 A | 3/2016 | |
| CN | 105682937 A | 6/2016 | |
| CN | 106004222 A | 10/2016 | |
| CN | 106042766 A | 10/2016 | |
| CN | 205930044 U | 2/2017 | |
| DE | 10 2011 008 529 A1 | 7/2012 | |
| JP | 07-205608 A | 8/1995 | |
| JP | 2006-96173 A | 4/2006 | |
| JP | 2013-086712 A | 5/2013 | |
| JP | 2014-118128 A | 6/2014 | |
| JP | 2014-213789 A | 11/2014 | |
| JP | 2015-116868 A | 6/2015 | |
| WO | WO-2014188912 A1 * | 11/2014 | B29D 30/02 |
| WO | 2015/198387 A1 | 12/2015 | |
| WO | 2016098477 A1 | 6/2016 | |

OTHER PUBLICATIONS

Search Report of Office Action dated Feb. 23, 2021, issued by the Chinese Patent Office in application No. 2018800303693.

International Search Report for PCT/JP2018/010848 dated Jun. 12, 2018 (PCT/ISA/210).

Search Report dated Aug. 11, 2021 from the China National Intellectual Property Administration in CN Application No. 201880030369.3.

Zang Liguo et al., "Mechanical elastic wheel improving road holding and wear resistance of tire", Transactions of the Chinese Society of Agricultural Engineering, Jun. 2014, vol. 30, No. 12, pp. 56-63 (8 pages).

Search Report of Notice of Allowance dated Jan. 6, 2022, issued in Chinese Application No. 201880030369.3.

* cited by examiner

NON-PNEUMATIC TIRE

TECHNICAL FIELD

The present invention relates to a non-pneumatic tire.

This application is a National Stage of International Application No. PCT/JP2018/010848 filed Mar. 19, 2018, claiming priority based on Japanese Patent Application No. 2017-094664, filed May 11, 2017, the content of which is incorporated herein by reference.

BACKGROUND ART

In the related art, for example, the non-pneumatic tires described in Patent Document 1 and 2 are known. Each of the non-pneumatic tires includes an elastically deformable tire part which includes an inner cylinder attached to an axle shaft, an outer cylinder configured to surround the inner cylinder from the outside in a tire radial direction, a linking member configured to link the inner cylinder to the outer cylinder and a tread member externally fitted onto the outer cylinder. An elastic modulus of a material forming the tread member is smaller than an elastic modulus of a material forming a tire part. An outer circumferential surface of the outer cylinder and an outer circumferential surface of the tread member are formed in a curved shape in which the outer circumferential surfaces thereof protrude outward in the tire radial direction when viewed in a vertical cross-sectional view in both a tire width direction and the tire radial direction.

According to this non-pneumatic tire, the outer circumferential surface of the tread member is formed in a curved shape in which the outer circumferential surface thereof protrudes outward in the tire radial direction when viewed in the vertical cross-sectional view. Thus, for example, even if a camber angle is increased in cornering or the like, it is possible to secure a ground contact area of a non-pneumatic tire.

CITATION LIST

Patent Document

[Patent Document 1]
United States Patent Application, Publication No. 2011/0290394
[Patent Document 2]
United States Patent Application, Publication No. 2012/0038207

SUMMARY OF INVENTION

Technical Problem

However, in the non-pneumatic tire in the related art, it is difficult to ensure a thickness of a tread member in a tire equatorial section. In addition, for example, the unevenness of a road surface is not sufficiently absorbed. Thus, riding comfort is likely to deteriorate or the tread member is likely to become worn early.

The present invention was made in view of the above-described circumstances and an object of the present invention is to increase the lifespan of a part while ensuring riding comfort.

A non-pneumatic tire according to the present invention includes: an elastically deformable tire part which includes an inner cylinder attached to an axle shaft, an outer cylinder configured to surround the inner cylinder from the outside in a tire radial direction, and a linking member configured to link the inner cylinder to the outer cylinder; and a tread member externally fitted onto the outer cylinder, wherein an elastic modulus of a material forming the tread member is smaller than an elastic modulus of a material forming the tire part, an outer circumferential surface of the tread member is formed in a curved shape in which the outer circumferential surface thereof protrudes outward in the tire radial direction when viewed in a vertical cross-sectional view in both the tire width direction and a tire radial direction, the outer cylinder includes an outer circumferential section positioned on a tire equatorial section, side sections positioned on both sides in a tire width direction with respect to the outer circumferential section, and a shoulder section configured to connect the outer circumferential section to the side sections, and the outer circumferential section is formed in a straight linear form in which the outer circumferential section extends in the tire width direction and the shoulder section gradually extends inward in the tire radial direction as it goes outward in the tire width direction when viewed in the vertical cross-sectional view.

Advantageous Effects of Invention

According to the present invention, it is possible to increase the lifespan of a part while ensuring riding comfort.

DESCRIPTION OF EMBODIMENTS

First Embodiment

A constitution of a non-pneumatic tire according to this embodiment will be described below with reference to FIGS. 1 and 2. Note that, in each drawing used in the following description, the scale is appropriately changed to set each member to have a distinguishable size. Furthermore, in each drawing, hatching may be omitted to facilitate the viewing of the drawings in some cases when an outer cylinder 4 and a tread member 5 which will be described later are viewed in a vertical cross-sectional view.

Figure 1:
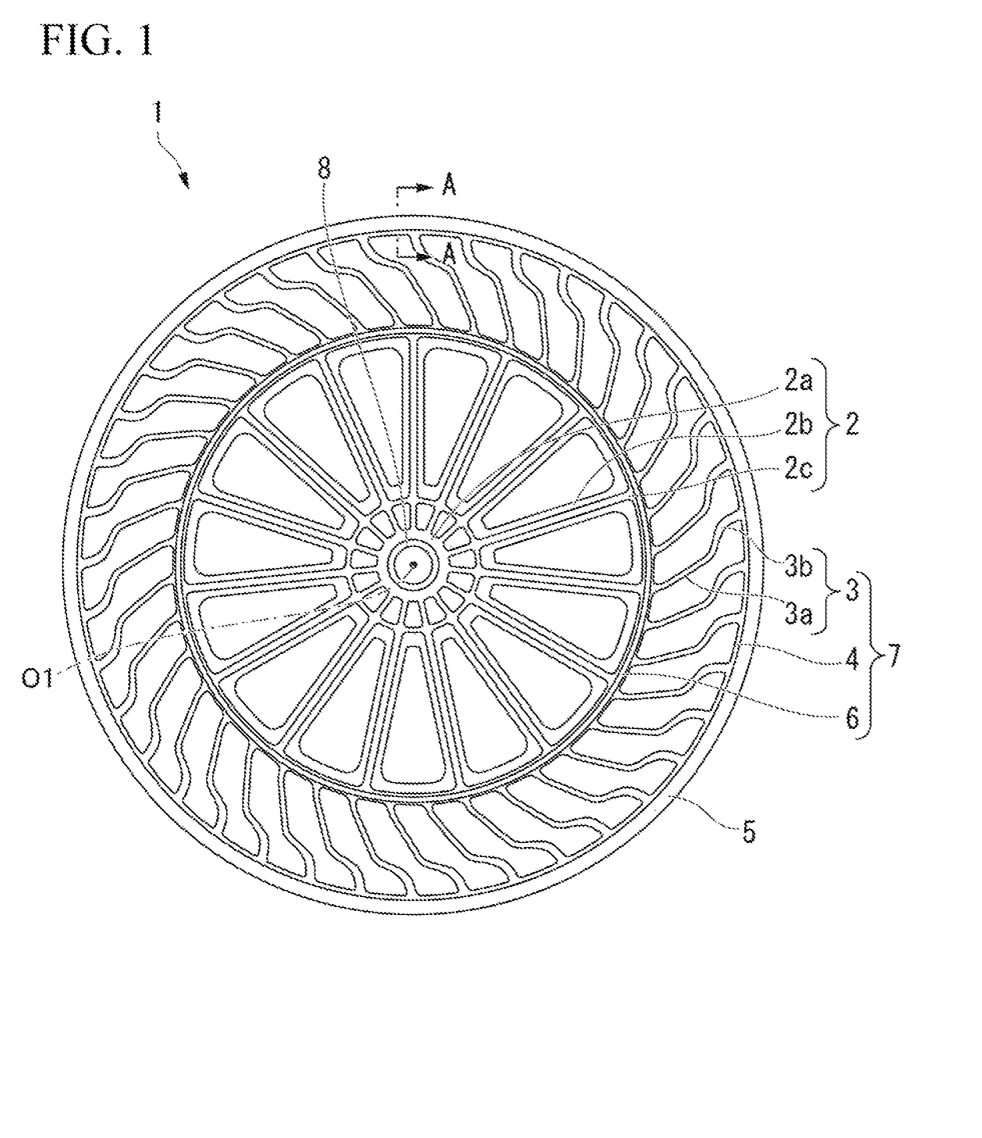
FIG. 1 is a side view of a non-pneumatic tire according to a first embodiment of the present invention.

As illustrated in FIG. 1, a non-pneumatic tire 1 includes a wheel section 2 attached to an axle shaft and a tire section 7 disposed on an outer circumference of the wheel section 2.

This non-pneumatic tire 1 is used for bicycles, two-wheeled vehicles, automobiles, and the like (hereinafter generally referred to simply as a "vehicle"), particularly, a vehicle (specifically, two-wheeled vehicles, three-wheeled vehicles, and the like) which travels while a vehicle body is tilted (banked) in a leftward/rightward direction of the vehicle body (a tire width direction which will be described later).

Here, the wheel section 2 is formed in a disk shape, the tire section 7 is formed in an annular shape, and each central axis is positioned on a common axis. This common axis is referred to as a central axis O1 and a direction along the central axis O1 is referred to as a tire width direction. Furthermore, in a side view when viewed from the tire width direction, a direction around the central axis O1 as a center is referred to as a tire circumferential direction and a direction orthogonal to this central axis O1 is referred to as a tire radial direction.

Figure 2:
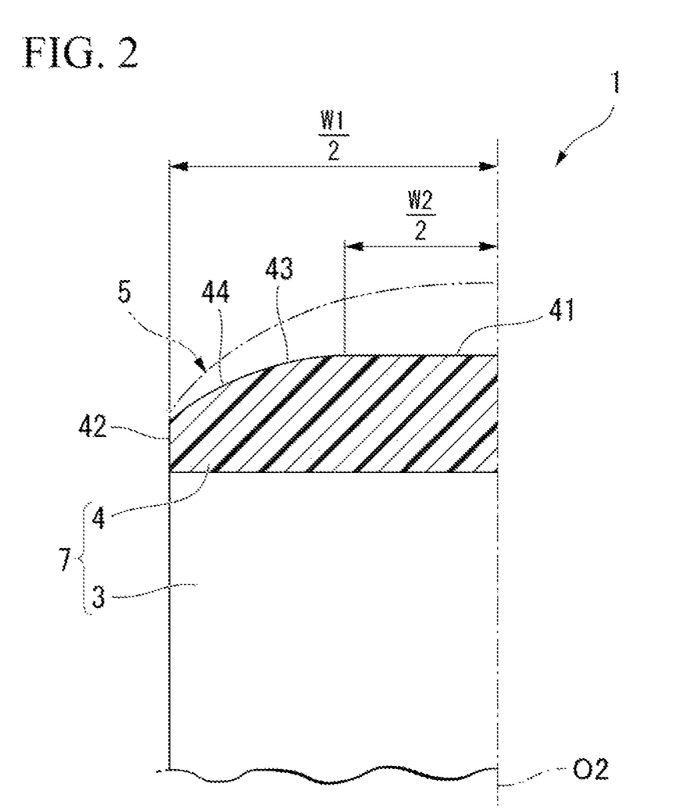
FIG. 2 is a cross-sectional arrow view (a vertical cross-sectional view) taken along line A-A shown in FIG. 1.

As illustrated in FIG. 2, the wheel section 2, the tire section 7, and the tread member 5, which will be described later, are formed line-symmetrically as a whole about a central line O2 which passes through a central portion (a tire equatorial section) in the tire width direction. In a vertical cross-sectional view in both the tire width direction and the tire radial direction, a direction in the tire width direction toward this central line O2 is referred to as an inner side in the tire width direction and a direction in the tire width direction away from this central line O2 is referred to as an outer side in the tire width direction.

As illustrated in FIG. 1, the wheel section 2 includes a tubular boss 8 extending in the tire width direction about the central axis O1, an installation cylinder section 2a fixed to an outer circumferential surface of the boss 8, an exterior cylinder section 2c configured to surround the installation cylinder section 2a from the outside in the tire radial direction, and a plurality of ribs 2b configured to link the installation cylinder section 2a to the exterior cylinder section 2c.

In this embodiment, the boss 8 is made of aluminum. The boss 8 is rotatably supported by the axle shaft so that the wheel section 2 is attached to the axle shaft. It should be noted that the boss 8 may be made of a metal other than aluminum or a non-metal. In the tire width direction, the width of the boss 8 is larger than widths of the installation cylinder section 2a, the plurality of ribs 2b, and the exterior cylinder section 2c.

The installation cylinder section 2a and the exterior cylinder section 2c are disposed coaxially with the boss 8. The plurality of ribs 2b are disposed, for example, at equal intervals in the tire circumferential direction. The plurality of ribs 2b extend radially about the boss 8.

In this embodiment, the installation cylinder section 2a, the plurality of ribs 2b, and the exterior cylinder section 2c are integrally made of a thermoplastic resin. Thus, the wheel section 2 can be molded through injection molding and is appropriate for mass production.

It should be noted that the boss 8, the installation cylinder section 2a, the plurality of ribs 2b, and the exterior cylinder section 2c may be formed separately. Furthermore, the installation cylinder section 2a, the plurality of ribs 2b, and the exterior cylinder section 2c may be made of materials other than a thermoplastic resin.

The tire section 7 includes an inner cylinder 6 externally fitted onto the exterior cylinder section 2c of the wheel section 2, the outer cylinder 4 configured to surround the inner cylinder 6 from the outside in the tire radial direction, and elastically deformable linking members 3 configured to link the inner cylinder 6 to the outer cylinder 4 so that they are displaceable. The tread member 5 is fitted onto an outer circumferential surface of the outer cylinder 4.

The inner cylinder 6 is attached to the axle shaft with the wheel section 2 therebetween. Central axes of the inner cylinder 6 and the outer cylinder 4 are disposed coaxially with the central axis O1. The inner cylinder 6, the linking members 3, and the outer cylinder 4 are disposed in the tire width direction in a state in which central portions thereof coincide with each other in the tire width direction.

In this embodiment, the inner cylinder 6, the linking members 3, and the outer cylinder 4 are integrally made of a thermoplastic resin. Thus, the tire section 7 can be molded through injection molding and is appropriate for mass production. Examples of the thermoplastic resin include only one kind of resin, a mixture containing two or more kinds of resins, or a mixture containing one or more kinds of resins and one or more kinds of elastomers and the thermoplastic resin may include additives, such as anti-aging agents, plasticizers, fillers, or pigments. In this way, it is possible to secure a degree of freedom concerning the design of the tire section 7 by integrally forming the inner cylinder 6, the linking members 3, and the outer cylinder 4 using a thermoplastic resin. Thus, for example, various shapes of an outer circumferential section 41, side sections 42, and a shoulder section 43 of the outer cylinder 4 which will be described later can be easily realized.

It should be noted that the inner cylinder 6, the linking members 3, and the outer cylinder 4 may be formed separately. Furthermore, the inner cylinder 6, the linking members 3, and the outer cylinder 4 may be made of materials other than a thermoplastic resin.

The tire section 7 and the wheel section 2 may be formed integrally and may be formed separately. It should be noted that the wheel section 2 has a function of linking the boss 8 to the tire section 7 and the tire section 7 is elastically deformable and has a function of absorbing vibrations transmitted from the ground to the boss 8. In this way, since the wheel section 2 and the tire section 7 have different functions, the wheel section 2 and the tire section 7 may be made of different materials. For example, the tire section 7 may be made of a material having a relatively lower elastic modulus to ensure vibration absorption performance and the wheel section 2 may be made of a material having an elastic modulus larger than that of the tire section 7 to ensure speed. Furthermore, for example, the wheel section 2 may be made of a material having a relatively lower specific gravity and a weight of the entire non-pneumatic tire 1 may be reduced.

The tread member 5 is made of, for example, vulcanized rubber obtained by vulcanizing natural rubber and/or a rubber composition, a thermoplastic material, or the like. Examples of the thermoplastic material include thermoplastic elastomers, thermoplastic resins, and the like. Examples of the thermoplastic elastomers include amide-based thermoplastic elastomers (TPA), ester-based thermoplastic elastomers (TPC), olefin-based thermoplastic elastomers (TPO), styrene-based thermoplastic elastomers (TPS), urethane-based thermoplastic elastomers (TPU), cross-linked thermoplastic rubber (TPV), other thermoplastic elastomers (TPZ), and the like defined in Japanese Industrial Standard JIS K6418.

Examples of the thermoplastic resins include urethane resins, olefin resins, vinyl chloride resins, polyamide resins, or the like. It should be noted that it is desirable that the tread member 5 be made of vulcanized rubber in view of wear resistance.

The linking members 3 is formed in a rectangular plate shape in which the linking members 3 is bent as a whole, front and rear surfaces thereof are directed in the tire circumferential direction, and side surfaces thereof are directed in the tire width direction. The linking members 3 are made of an elastically deformable material and links an outer circumferential surface side of the inner cylinder 6 to an inner circumferential surface side of the outer cylinder 4 so that they are relatively elastically displaceable. The linking members 3 are disposed at equal intervals in the tire circumferential direction.

Each of the plurality of linking members 3 has an inner section 3a connected to the inner cylinder 6 and an outer section 3b connected to the outer cylinder 4. The inner section 3a and the outer section 3b are connected to each other at a central portion of the linking members 3 in the tire radial direction and intersect at an obtuse angle at a connection section when viewed in a side view.

A thickness of the inner section 3a in the tire circumferential direction is smaller than a thickness of the outer section 3b in the tire circumferential direction. The thickness of the outer section 3b in the tire circumferential direction gradually increases in the tire radial direction.

It should be noted that a form of the linking members 3 is not limited to the example illustrated in the drawings, other constitutions may be adopted as long as the linking members 3 can be elastically deformed and the tire functions as a non-pneumatic tire. For example, in the case of a disk-shaped linking member between the inner cylinder 6 and the outer cylinder 4, a constitution in which the disk-shaped linking member is cut into a honeycomb shape, a constitution in which a plate-like linking member is disposed radially about the axle shaft, a constitution in which radial linking members are linked using an intermediate member, and the like may be adopted.

Here, in this embodiment, as illustrated in FIG. 2, the outer cylinder 4 includes the outer circumferential section 41 disposed on the tire equatorial section (the central line O2), the side sections 42 positioned on both sides in the tire width direction with respect to the outer circumferential section 41, and the shoulder section 43 configured to connect the outer circumferential section 41 to the side sections 42.

The outer circumferential section 41 is an outer end portion of the outer cylinder 4 in tire radial direction. The outer circumferential section 41 is formed in a straight linear form in which the outer circumferential section 41 extends in the tire width direction when viewed in the vertical cross-sectional view. The outer circumferential section 41 is formed line-symmetrically in the tire width direction with respect to the tire equatorial section when viewed in the vertical cross-sectional view.

The side sections 42 are outer end portions of the outer cylinder 4 in the tire width direction and a pair of such side sections 42 are disposed. The side sections 42 are positioned further inward in the tire radial direction than the outer circumferential section 41. The side sections 42 are formed in a straight linear form in which the side sections 42 extend in the tire radial direction when viewed in the vertical cross-sectional view. The pair of side sections 42 are formed line-symmetrically in the tire width direction with respect to the tire equatorial section when viewed in the vertical cross-sectional view.

The shoulder section 43 is chamfered over the entire circumference in the tire circumferential direction. The shoulder section 43 gradually extends inward in the tire radial direction and outward in the tire width direction when viewed in the vertical cross-sectional view. The shoulder section 43 is formed in a curved shape in which the shoulder section 43 protrudes outward in the tire width direction and outward in the tire radial direction when viewed in the vertical cross-sectional view. The shoulder section 43 is subjected to so-called R surface-chamfering.

The shoulder section 43 is formed of one circular arc section 44 (fillet) having a single curvature when viewed in the vertical cross-sectional view. The circular arc section 44 is in contact with the outer circumferential section 41 from the outside in the tire width direction and the outer circumferential section 41 is positioned on a tangent line in the circular arc section 44. Thus, the outer circumferential section 41 is smoothly connected to the circular arc section 44 without a step. On the other hand, contact points between the circular arc section 44 and the side sections 42 form corner portions when viewed in the vertical cross-sectional view. The circular arc section 44 is connected to the side sections 42 with steps.

It should be noted that, when a width of the outer cylinder 4 in the tire width direction is set to W1 and a width of the outer circumferential section 41 in the tire width direction is set to W2, $0.1 \leq W2/W1 \leq 0.6$ is satisfied. The width W1 is a distance between the pair of side sections 42 in the tire width direction.

Also, an inner circumferential surface of the outer cylinder 4 is formed in a straight linear form in which the inner circumferential surface thereof extends in the tire width direction when viewed in the vertical cross-sectional view.

An elastic modulus of a material forming the tread member 5 is smaller than an elastic modulus of a material forming the tire section 7. An outer circumferential surface of the tread member 5 is formed in a curved shape in which the outer circumferential surface protrudes outward in the tire radial direction when viewed in the vertical cross-sectional view.

The tread member 5 covers the outer circumferential section 41 and the shoulder section 43 in the outer cylinder 4 and opens so that the side sections 42 are exposed. The tread member 5 is formed to have one annular body in which the tread member 5 covers the outer circumferential section 41 and the shoulder section 43 over the entire region thereof.

As described above, according to the non-pneumatic tire 1 associated with this embodiment, the outer circumferential section 41 of the outer cylinder 4 is formed in a straight linear form in which the outer circumferential section 41 thereof extends in the tire width direction when viewed in the vertical cross-sectional view. Therefore, it is possible to secure a thickness of the tread member 5 while minimizing a thickness of the outer cylinder 4 in the tire equatorial section, compared with a case in which the outer circumferential section 41 of the outer cylinder 4 is formed in a curved shape in which the outer circumferential section 41 thereof protrudes outward in the tire radial direction when viewed in the vertical cross-sectional view. Thus, it is possible to increase the lifespan of a part while ensuring riding comfort.

Also, the shoulder section 43 of the outer cylinder 4 gradually extends inward in the tire radial direction toward the tire width direction when viewed in the vertical cross-sectional view. Therefore, in a portion in the tread member 5 positioned outside the outer cylinder 4 in the tire radial direction with respect to the shoulder section 43 (hereinafter referred to as a "shoulder portion of the tread member 5"), the thickness of the tread member 5 can be reduced. Furthermore, in the shoulder portion of the tread member 5, the thickness of the tread member 5 can be gradually reduced outward from the inner side thereof in the tire width direction. Thus, it is possible to minimize an increase in rolling resistance with respect to an input with a large camber angle, such as cornering.

Furthermore, since 0.1≤W2/W1≤0.6 is satisfied, it is possible to ensure riding comfort regardless of a magnitude of the camber angle. That is to say, in a case in which W2/W1 is smaller than 0.1, when a size of the outer circumferential section 41 in the outer cylinder 4 is too small, a thickness of the tread member 5 is reduced in the tire equatorial section, and a camber angle is small, riding comfort is likely not to be able to be secured. In addition, in a case in which W2/W1 is larger than 0.6, when a size of the shoulder section 43 in the outer cylinder 4 is too small, a thickness of a shoulder portion of the tread member 5 is reduced, and a camber angle is large, riding comfort may not be secured.

Also, the shoulder section 43 of the outer cylinder 4 is formed in a curved shape when viewed in the vertical cross-sectional view. Therefore, it is possible to relax the compressive stress occurring in the tread member 5 and it is possible to effectively minimize damage of the tread member 5 occurring.

Furthermore, an outer circumferential surface of the tread member 5 is formed in a curved shape in which the outer circumferential surface thereof protrudes outward in the tire radial direction when viewed in the vertical cross-sectional view. Therefore, for example, even if the camber angle is increased in cornering or the like, it is possible to secure a ground contact area of the non-pneumatic tire 1.

In addition, the shoulder section 43 of the outer cylinder 4 is formed in a curved shape in which the shoulder section 43 thereof protrudes outward in the tire width direction and outward in the tire radial direction when viewed in the vertical cross-sectional view. Therefore, as described above, when the camber angle is increased, it is possible to ground the shoulder section 43 of the outer cylinder 4 through the tread member 5 without a sense of incongruity and to improve riding comfort.

Second Embodiment

Figure 3:
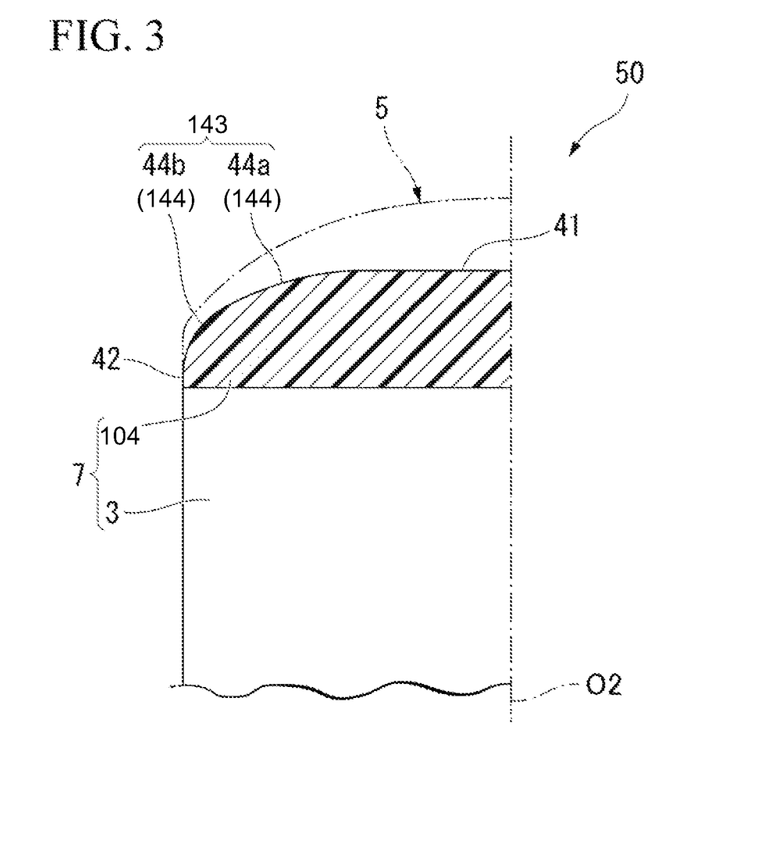
FIG. 3 is a vertical cross-sectional view of a main part of a non-pneumatic tire according to a second embodiment of the present invention.

A non-pneumatic tire 50 according to a second embodiment associated with the present invention will be described below with reference to FIG. 3.

It should be noted that constituent elements of the second embodiment that are the same as those of the first embodiment will be denoted with reference numerals that are the same as those of the first embodiment, description thereof will be omitted, and only differences will be described.

In the non-pneumatic tire 50 according to this embodiment, a plurality of (two in the example illustrated in the drawing) circular arc sections 144 (first circular arc section 44a and second circular arc section 44b) are disposed in the tire width direction. A shoulder section 143 of an outer cylinder 104 is formed of the plurality of circular arc sections 144 over the entire region in the tire width direction. The plurality of circular arc sections 144 have different curvatures when viewed in the vertical cross-sectional view. In this embodiment, when viewed in the vertical cross-sectional view, the plurality of circular arc sections 144 are disposed such that the circular arc sections 144 adjacent to each other in the tire width direction have a common tangent line at contact points between the circular arc sections 144, in other words, the circular arc sections 144 adjacent to each other in the tire width direction are in contact with each other. In the plurality of circular arc sections 144, the curvature gradually increases from the circular arc section 144 positioned on an inner side in the tire width direction toward the circular arc section 144 positioned on an outer side in the tire width direction. If a curvature of a first circular arc section 44a positioned on an inner side in the tire width direction is set to R1 and a curvature of a second circular arc section 44b positioned on an outer side in the tire width direction is set to R2, R2>R1 is satisfied. When viewed in the vertical cross-sectional view, the second circular arc section 44b is in contact with a side section 42 from the outer side in the tire radial direction and the side sections 42 is positioned on a tangent line in the second circular arc section 44b. The second circular arc section 44b is smoothly connected to the side section 42 without a step.

As described above, according to the non-pneumatic tire 50 associated with this embodiment, in the plurality of circular arc sections 144, the curvature gradually increases from the circular arc sections 144 positioned on the inner side in the tire width direction toward the circular arc sections 144 position on the outer side in the tire width direction. Thus, it is possible to further relax the compressive stress occurring in the tread member 5.

Also, the shoulder section 143 of the outer cylinder 104 is formed of the plurality of circular arc sections 144 over the entire region in the tire width direction. Therefore, by disposing the plurality of circular arc sections 144 so that the plurality of circular arc sections 144 adjacent to each other in the tire width direction are in contact with each other when viewed in the vertical cross-sectional view, it is possible to smoothly form the shoulder section 143 of the outer cylinder 104 without a step. Thus, it is possible to further relax the compressive stress occurring in the tread member 5.

Third Embodiment

Figure 4:
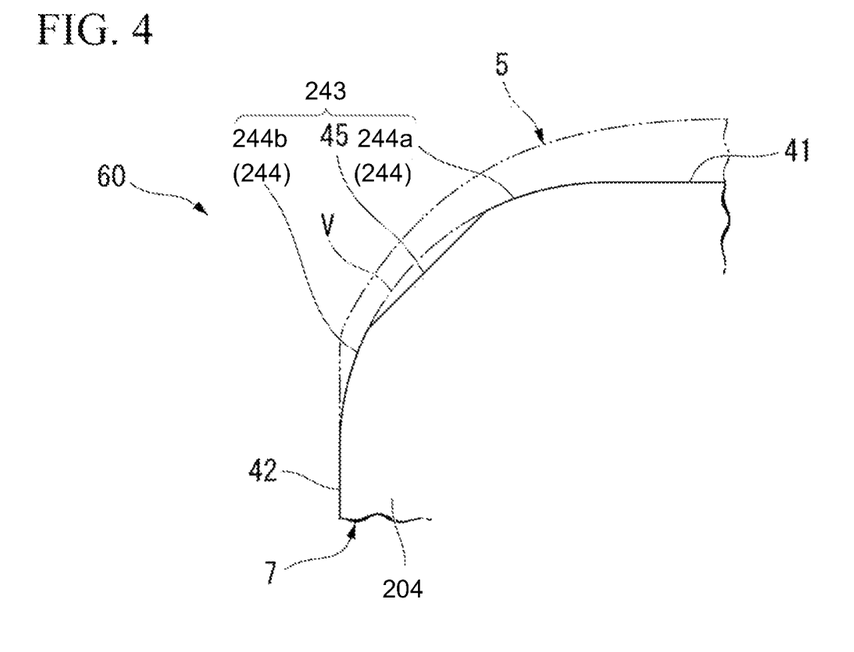
FIG. 4 is a vertical cross-sectional view of a main part of a non-pneumatic tire according to a third embodiment of the present invention.

A non-pneumatic tire 60 according to a third embodiment associated with the present invention will be described below with reference to FIG. 4.

It should be noted that constituent elements of the third embodiment that are the same as those of the second embodiment will be denoted with reference numerals that are the same as those of the second embodiment, description thereof will be omitted, and only differences will be described.

In the non-pneumatic tire 60 according to this embodiment, a shoulder section 243 in an outer cylinder 204 is formed of two (a plurality of) circular arc sections 244 (first circular arc section 244a and second circular arc section 244b) and one straight linear section 45. The two circular arc sections 244 have the same curvature when viewed in the vertical cross-sectional view. Centers of curvature of the two circular arc sections 244 are common. The straight linear section 45 is disposed between the two circular arc sections 244 and links the two circular arc sections 244 to each other. The straight linear section 45 extends straight when viewed in the vertical cross-sectional view. The circular arc sections 244 and the straight linear section 45 are connected to each other with steps. The two circular arc sections 244 are disposed on a single circular arc V.

Fourth Embodiment

Figure 5:
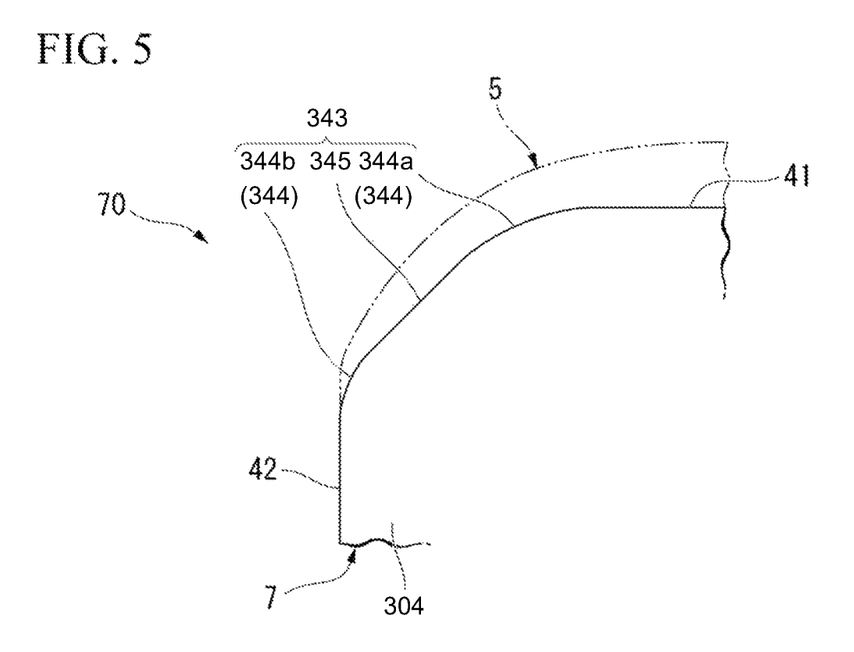
FIG. 5 is a vertical cross-sectional view of a main part of a non-pneumatic tire according to a fourth embodiment of the present invention.

A non-pneumatic tire 70 according to a fourth embodiment associated with the present invention will be described below with reference to FIG. 5.

It should be noted that constituent elements of the fourth embodiment that are the same as those of the third embodiment will be denoted with reference numerals that are the same as those of the third embodiment, description thereof will be omitted, and only differences will be described.

In the non-pneumatic tire 70 according to this embodiment, an outer cylinder 304 is formed of two circular arc sections 344 having different curvatures when viewed in the vertical cross-sectional view. If a curvature of a first circular arc section 344a positioned on an inner side in the tire width direction is set to R1 and a curvature of a second circular arc section 344b positioned on an outer side in the tire width direction is set to R2, R2>R1 is satisfied. The second circular arc section 344b is in contact with a side section 42 from the outside in the tire radial direction. The circular arc sections 344 is in contact with a straight linear section 345 and the straight linear section 345 is positioned on a tangent line in the circular arc sections 344 when viewed in the vertical cross-sectional view. The circular arc sections 344 are smoothly connected to the straight linear section 345 without a step.

Fifth Embodiment

Figure 6:
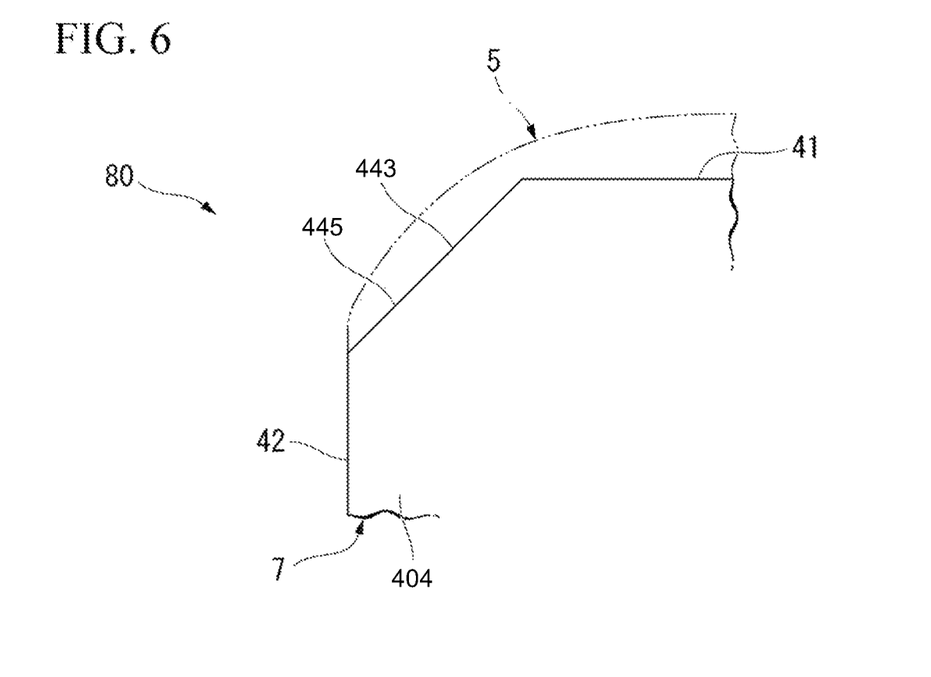
FIG. 6 is a vertical cross-sectional view of a main part of a non-pneumatic tire according to a fifth embodiment of the present invention.

A non-pneumatic tire 80 according to a fifth embodiment associated with the present invention will be described below with reference to FIG. 6.

It should be noted that constituent elements of the fifth embodiment that are the same as those of the first embodiment will be denoted with reference numerals that are the same as those of the first embodiment, description thereof will be omitted, and only differences will be described.

In the non-pneumatic tire 80 according to this embodiment, a shoulder section 443 in an outer cylinder 404 is C surface-chamfered instead of being R surface-chamfered. The shoulder section 443 is formed of one straight linear section 445. The straight linear section 445 extends straight when viewed in the vertical cross-sectional view.

Sixth Embodiment

Figure 7:
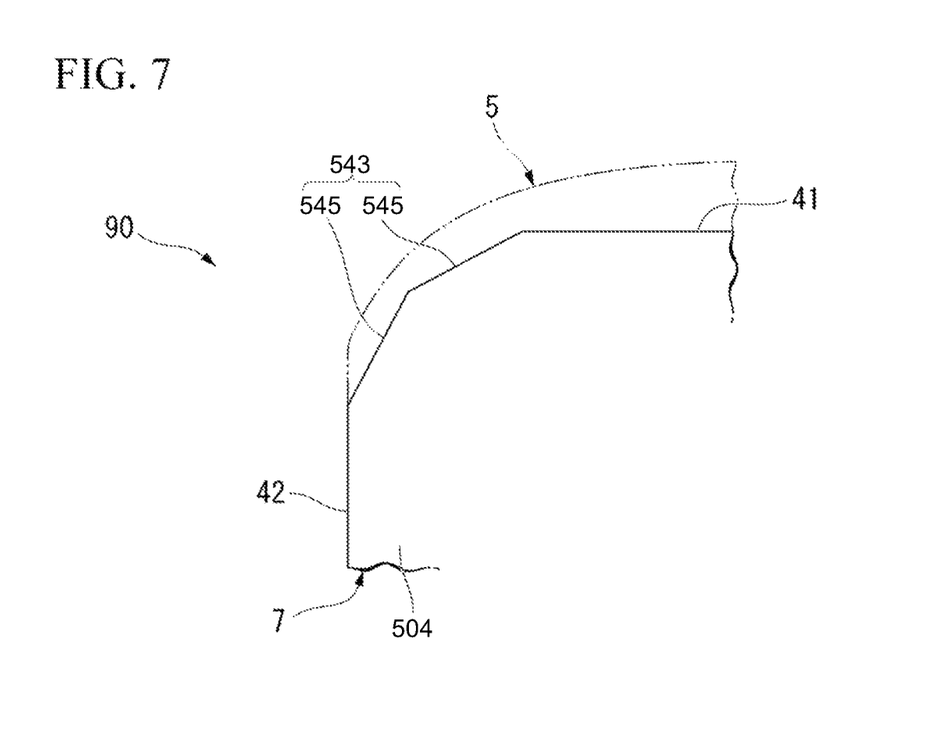
FIG. 7 is a vertical cross-sectional view of a main part of a non-pneumatic tire according to a sixth embodiment of the present invention.

A non-pneumatic tire 90 according to a sixth embodiment associated with the present invention will be described below with reference to FIG. 7.

It should be noted that constituent elements of the sixth embodiment that are the same as those of the fifth embodiment will be denoted with reference numerals that are the same as those of the fifth embodiment, description thereof will be omitted, and only differences will be described.

In the non-pneumatic tire 90 according to this embodiment, a shoulder section 543 in an outer cylinder 504 is formed of a plurality of (two in the example illustrated in the drawing) straight linear sections 545.

Note that the technical scope of the present invention is not limited to the above embodiments and various modifications can be performed without departing from the gist of the present invention.

0.1≤W2/W1≤0.6 may not be satisfied.

The side sections 42 may not be formed in a straight linear form in which the side sections 42 extend in the tire radial direction when viewed in the vertical cross-sectional view. For example, when viewed in the vertical cross-sectional view, the side sections 42 may be formed in a dot shape and the side sections 42 may not be formed in a planar shape in which the side sections 42 have a size in the tire radial direction.

In addition, it is possible to appropriately replace the constituent elements in the embodiments with known constituent elements without departing from the gist of the present invention and the above-mentioned modifications may be appropriately combined.

According to this invention, when viewed in the vertical cross-sectional view, the outer circumferential section of the outer cylinder is formed in a straight linear form in which the outer circumferential section thereof extends in the tire width direction. Therefore, it is possible to secure a thickness of the tread member while minimizing a thickness of the outer cylinder in the tire equatorial section, compared with a case in which the outer circumferential section of the outer cylinder is formed in a curved shape in which the outer circumferential section thereof protrudes outward in the tire radial direction when viewed in the vertical cross-sectional view. Thus, it is possible to increase the lifespan of a part while ensuring riding comfort.

Also, the shoulder section of the outer cylinder gradually extends inward in the tire radial direction and outward in the tire width direction when viewed in the vertical cross-sectional view. Therefore, in a portion in the tread member positioned outside the outer cylinder in the tire radial direction with respect to the shoulder section (hereinafter referred to as a "shoulder portion of the tread member"), the thickness of the tread member can be reduced.

Furthermore, in the shoulder portion of the tread member 5, the thickness of the tread member 5 can be gradually reduced outward from the inner side thereof in the tire width direction. Thus, it is possible to minimize an increase in rolling resistance with respect to an input with a large camber angle, such as cornering.

The shoulder section may be formed in a curved shape in which the shoulder section protrudes outward in the tire width direction and outward in the tire radial direction when viewed in the vertical cross-sectional view.

In this case, the shoulder section of the outer cylinder is formed in a curved shape when viewed in the vertical cross-sectional view. Therefore, it is possible to relax the compressive stress occurring in the tread member and it is possible to effectively minimize damage of the tread member occurring.

The shoulder section includes a plurality of circular arc sections which are disposed in the tire width direction and have different curvatures when viewed in the vertical cross-sectional view. In addition, in the plurality of circular arc sections, the curvatures may gradually increase from the circular arc section positioned on an inner side in the tire width direction toward the circular arc section positioned on an outer side in the tire width direction.

In this case, in the plurality of circular arc sections, the curvature gradually increases from the circular arc section positioned on the inner side in the tire width direction toward the circular arc section positioned on the outer side in the tire width direction. Thus, it is possible to further relax the compressive stress occurring in the tread member.

The shoulder section may be formed of the plurality of circular arc sections over the entire region in the tire width direction.

In this case, the shoulder section in the outer cylinder is formed of the plurality of circular arc sections over the entire region in the tire width direction. Therefore, since, for example, the plurality of circular arc sections are disposed such that the circular arc sections adjacent to each other in the tire width direction when viewed in the vertical cross-sectional view have a common tangent line at contact points between the circular arc sections, in other words, the circular arc sections adjacent to each other in the tire width direction are in contact with each other, it is possible to smoothly form the shoulder section in the outer cylinder without a step.

Thus, it is possible to further relax the compressive stress occurring in the tread member.

When the width of the outer cylinder in the tire width direction is set to W1 and the width of the outer circumferential section in the tire width direction is set to W2, 0.1≤W2/W1≤0.6 may be satisfied.

In this case, since 0.1≤W2/W1≤0.6 is satisfied, it is possible to ensure riding comfort regardless of a magnitude of the camber angle. That is to say, when W2/W1 is smaller than 0.1, a size of the outer circumferential section in the outer cylinder is too small, a thickness of the tread member 5 decreases in the tire equatorial section, and the camber angle is small, riding comfort is likely not to be able to be secured. Furthermore, when W2/W1 is larger than 0.6, a size of the shoulder section of the outer cylinder is too small, a thickness of the shoulder portion in the tread member decreases, and the camber angle is large, riding comfort is likely not to be able to be secured.

INDUSTRIAL APPLICABILITY

According to the present invention, it is possible to increase a lifespan of a part while ensuring riding comfort.

The invention claimed is:

1. A non-pneumatic tire, comprising:
an elastically deformable tire part which includes an inner cylinder attached to an axle shaft, an outer cylinder configured to surround the inner cylinder from the outside in a tire radial direction, and a linking member configured to link the inner cylinder to the outer cylinder; and
a tread member externally fitted onto the outer cylinder, wherein an elastic modulus of a material forming the tread member is smaller than an elastic modulus of a material forming the tire part,
an outer circumferential surface of the tread member is formed in a curved shape in which the outer circumferential surface thereof protrudes outward in the tire radial direction when viewed in a vertical cross-sectional view in both the tire width direction and a tire radial direction,
the outer cylinder includes an outer circumferential section positioned on a tire equatorial section, side sections positioned on both sides in a tire width direction with respect to the outer circumferential section, and a shoulder section configured to connect the outer circumferential section to the side sections,
the outer circumferential section is formed in a straight linear form in which the outer circumferential section extends in the tire width direction and the shoulder section gradually extends inward in the tire radial direction as it goes outward in the tire width direction when viewed in the vertical cross-sectional view,
the shoulder section is formed in a curved shape in which the shoulder section protrudes outward in the tire width direction and outward in the tire radial direction when viewed in the vertical cross-sectional view,
the shoulder section includes a plurality of circular arc sections which are disposed in the tire width direction and have different curvatures when viewed in the vertical cross-sectional view, and
in the plurality of circular arc sections, the curvatures gradually increase from the circular arc section positioned on an inner side in the tire width direction toward the circular arc section positioned on an outer side in the tire width direction.

2. The non-pneumatic tire according to claim 1, wherein the shoulder section in the outer cylinder is formed of the plurality of circular arc sections over the entire region in the tire width direction.

3. The non-pneumatic tire according to claim 2, wherein, when a width of the outer cylinder in the tire width direction is set to W1 and a width of the outer circumferential section in the tire width direction is set to W2, 0.1≤W2/W1≤0.6 is satisfied.

4. The non-pneumatic tire according to claim 1, wherein, when a width of the outer cylinder in the tire width direction is set to W1 and a width of the outer circumferential section in the tire width direction is set to W2, 0.1≤W2/W1≤0.6 is satisfied.

* * * * *